Oct. 7, 1941.  D. F. COLLINS  2,258,238
METHOD FOR MANUFACTURING FLOOR MATS
Filed Oct. 16, 1939  2 Sheets-Sheet 1
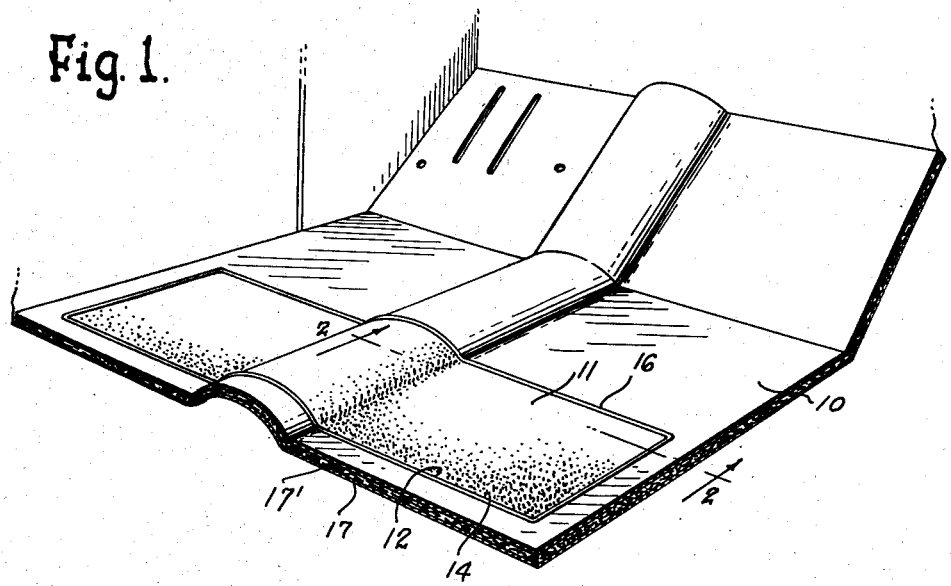
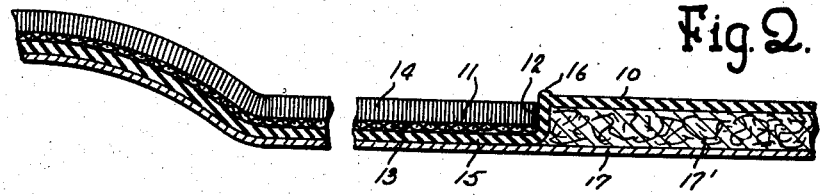
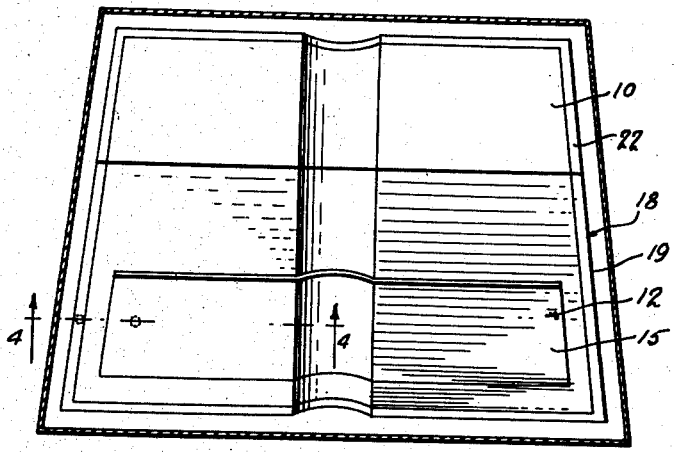
INVENTOR.
Don Fremont Collins
BY
ATTORNEYS Oct. 7, 1941.  D. F. COLLINS  2,258,238
METHOD FOR MANUFACTURING FLOOR MATS
Filed Oct. 16, 1939  2 Sheets-Sheet 2
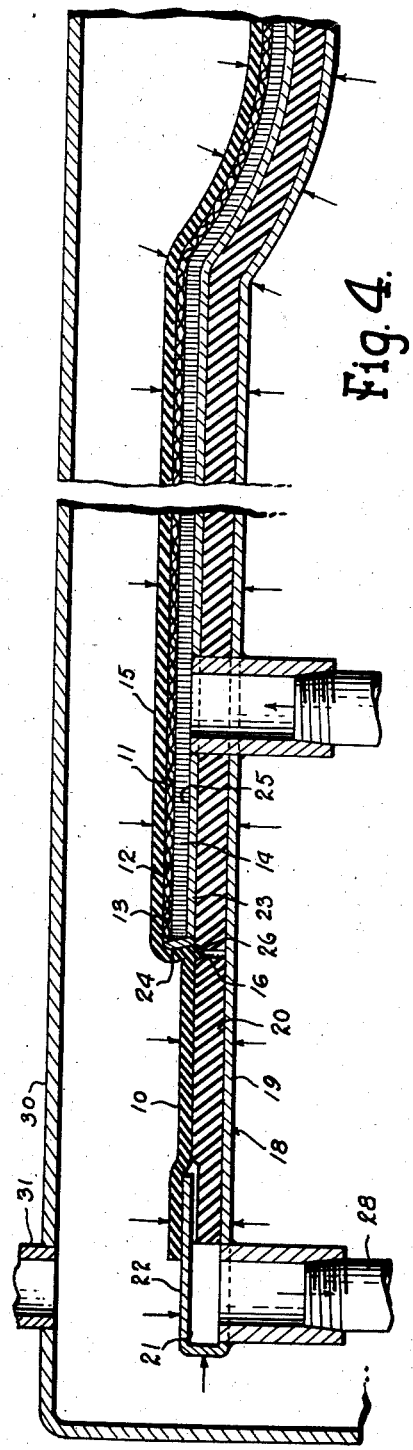
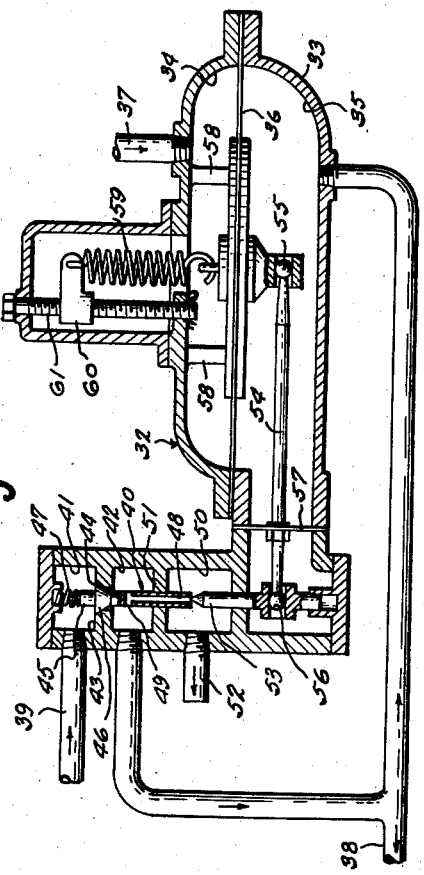
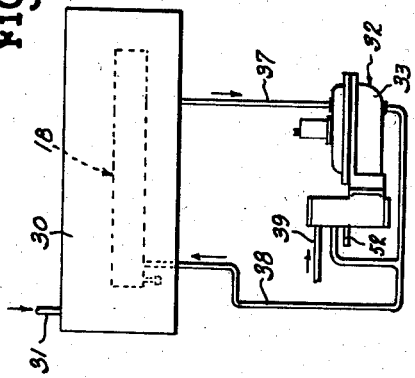
INVENTOR.
Don Fremont Collins
BY
ATTORNEYS Patented Oct. 7, 1941

2,258,238

UNITED STATES PATENT OFFICE 2,258,238

METHOD FOR MANUFACTURING FLOOR MATS

Don Fremont Collins, Pontiac, Mich., assignor to Baldwin Rubber Company, Pontiac, Mich., a corporation of Michigan Application October 16, 1939, Serial No. 299,729

5 Claims. (Cl. 154—2)

This invention relates generally to an improved method and apparatus for manufacturing floor coverings.

More particularly, the invention concerns itself with the manufacture of composite floor mats having a flexible covering sheet of a vulcanizable material, such as rubber, and having a tread portion of smooth material, such as a pile fabric.

In many installations, the flooring to be covered has an irregular surface contour and, in the case of vehicle body flooring, is frequently fashioned with a "hump" or "tunnel" to provide clearance for parts of the power plant of the vehicle extending along the underside of the flooring. To this end, the invention contemplates prefashioning a composite mat of the type set forth in the preceding paragraph to the contour of an irregular floor surface by a method composed of a relatively few simple steps capable of being inexpensively carried out with relatively simple practical apparatus.

The present invention provides for obtaining the foregoing results by curing the sheet of covering material to the contour of the flooring surface to be covered by the material and at the same time permanently securing the tread sheet of pile fabric to the covering sheet without matting or otherwise disturbing the pile of the fabric. Accordingly, both sheets of the composite mat are simultaneously contoured to neatly fit the irregularities of the flooring surface to be covered by the mat at the same time the sheets are united together, and this not only results in imparting a pleasing appearance to the mat but, in addition, reduces the time required to manufacture the mat to a minimum.

Another object of this invention which renders the present method of manufacture commercially practical, particularly when the tread sheet is of the pile fabric type, consists in the novel manner in which the piling of the fabric is protected during the curing process so that the pile will not become matted or destroyed. In accordance with the present invention, opposite sides of the mat in the area of the pile fabric are subjected to positive differential pressures. The pressure applied to the undersurface of the covering sheet is sufficient to press the opposite side of the sheet against the contoured surface of the form and the counteracting pressure acting on the area occupied by the pile fabric is sufficient to support the pile fabric above the adjacent surface of the form, with the result that the pile is prevented from matting under the influence of the pressure applied to the undersurface of the covering sheet. However, the pressure applied to the pile fabric is slightly less than the opposing pressure in order to permit the mat to follow the contour of the form, and this latter pressure is preferably applied in the form of a fluid preheated to cure the covering sheet to the contour of the form.

A further object of the present invention resides in the apparatus employed for carrying out the several steps of the method and particularly in the valve for maintaining the desired balancing between the counteracting pressures set forth above.

The foregoing, as well as other objects, will be made more apparent as this description proceeds, especially when considered in connection with the accompanying drawings, wherein:

Figure 1 is a perspective view of a section of a vehicle body flooring covered by a composite mat manufactured in accordance with the present method;

Figure 2 is a sectional view taken substantially on the plane indicated by the line 2—2 of Figure 1;

Figure 3 is a plan view of a contoured form and illustrating a mat supported on the top surface thereof;

Figure 4 is a sectional view taken substantially on the plane indicated by the line 4—4 of Figure 3;

Figure 5 is a diagrammatic view illustrating the differential pressure controlled valve;

Figure 6 is a sectional view through the valve.

In Figures 1 and 2, I have illustrated a mat fashioned in accordance with this invention and applied to a typical floor section of a motor vehicle body. Upon reference to Figure 2, it will be noted that the mat comprises a covering sheet 10 preferably formed of a vulcanizable material and prefashioned to the contour of the particular floor to be covered by the mat during the curing operation. In the present instance, the mat is also provided with an insert 11 formed separately from the covering sheet 10 and permanently secured in a depressed portion 12 of the sheet. The size of the insert 11 will, of course, vary in accordance with specified designs of floor mats and may either cover substantially the entire surface area of the sheet 10, or merely a portion of the sheet, as shown in Figure 1. It will also be understood that the insert may be divided into sections and arranged on the surface of the covering sheet 10 to provide various different designs.

In the illustrated embodiment of the invention, the insert 11 is in the form of a sheet of pile fabric having a base 13 and having a pile 14. In the interests of simplicity and manufacture, the bottom surface of the base 13 is permanently secured to the bottom wall 15 of the recess 12 in the covering sheet 10 during the curing process and the sheet of pile fabric is preferably surrounded by a bead 16 formed on the covering sheet 10. It will also be observed from Figure 2 that the portions of the covering sheet 10 are properly supported from the flooring 17 of the body by means of a backing material 17'. The backing material 17' is preferably formed of asbestos, flock or jute and is shown in Figure 2 as surrounding the recessed portion 12 of the mat, although, if desired, the backing may be extended beneath the bottom surface of the recessed portion 12.

Although various different types of apparatus may be provided for carrying out the several steps of the method of manufacturing a mat of the type previously described, nevertheless, it is believed that the method may be more fully understood by a brief description of the apparatus and, with this in view, one type of apparatus found particularly satisfactory is illustrated herein. In Figures 3 and 4, I have shown a mold form 18 corresponding in shape to the contour of the flooring 17 adapted to be covered by the mat. The form 18 is shown in Figure 4 as having a base plate 19 prefashioned to the contour of the flooring and having a sheet of hard rubber material 20 secured to the top surface thereof. The marginal portions of the plate 19 extend laterally beyond the hard rubber covering 20 and are return-bent to form a chamber 21 around the border of the hard rubber sheet 20. The top wall 22 of the chamber is shown as overlapping the top surface of the hard rubber covering sheet 20 and thereby assists in holding the sheet 20 in position on the contoured base sheet 19.

The portion of the top surface of the form 18, corresponding to the area of the mat occupied by the sheet of pile fabric 11, is covered by a sheet metal plate 23 having a continuously upwardly extending flange 24 at the margin thereof forming a pocket 25. The pocket 25 has a depth approximating the thickness of the pile fabric sheet 11 and defines an area substantially equal to the area of the pile fabric sheet. In the event it is desired to form the mat with the bead 16 surrounding the pile fabric, the hard rubber covering sheet 20 is fashioned with a recess 26 in the top surface thereof surrounding the flange 24.

*Method of manufacturing*

In producing the mat previously described, the sheet of pile fabric 11 is positioned in the pocket 25 on the form 18, with the pile facing downwardly and with the bottom surface of the base 13 substantially flush with the top edge of the flange 24. Prior to inserting the pile fabric 11 in the pocket 25, the undersurface of the base 13 is preferably coated with an adhesive material. It has been found that a rubber or curing cement is highly satisfactory, although a bituminous material, such as asphalt, which has the characteristic of becoming tacky under normal vulcanizing temperatures, may also be used. In either case, a sheet of uncured stock of sufficient size to form the covering sheet 10 is placed over the form 18 with the marginal edges thereof overlapping the flanges 22 and with the central portion extending over the pocket 25 in contact with the cemented surface of the base 13.

After the sheet of uncured stock is positioned on the form in the manner set forth, the chamber 21 is exhausted by a vacuum pump (not shown) communicating with the interior of the chamber 21 through the medium of the conduit 28. As a result, any air trapped between the uncured stock and adjacent surface of the form is exhausted and a vacuum seal is effected. In other words, the stock is drawn tightly against the adjacent surface of the form and the portion of the stock surrounding the recess 26 is drawn into this recess to form a bead 16, previously described as extending around the sheet of pile fabric.

The contoured form is then placed into a pressure chamber, designated generally in Figure 4 by the reference character 30, and fluid under pressure is admitted to the chamber through the medium of a supply conduit 31. The fluid under pressure acts upon the exposed surfaces of the mold form in the manner designated by the arrows in Figure 4 and is preheated to the temperature required to cure the stock to the contour of the form. In the event a curing cement is applied to the base of the pile fabric, the temperature of the fluid under pressure in the chamber 30 also reacts on the cement to permanently secure the pile fabric to the adjacent surface of the rubber stock at the time the latter is vulcanized. On the other hand, if a bituminous binder is employed, the latter is rendered tacky by the temperature of the fluid under pressure and an effective bond of the rubber stock to the base of the pile fabric is insured.

In order to prevent the force of the pressure acting upon the portion of the stock engaged by the base of the pile fabric from matting or otherwise detrimentally affecting the pile 14, provision is made herein for introducing a positive pressure in the pocket 25. The pressure of the fluid introduced into the pocket 25 counteracts the curing medium pressure applied to the stock and, although slightly less than the curing medium pressure, is sufficient to prevent collapsing of the portion of the mat extending over the pocket 25. As a result of this positive pressure differential, the pile 14 is retained in its natural state throughout the curing operation and a mat is attained which will not only neatly conform to the irregularities in the surface of the flooring, but which will have a very pleasing appearance.

The fluid under pressure is admitted to the pocket 25 practically at the same time that the pressure of the curing medium is applied to the stock, and the pressure in the pocket 25 is accurately controlled so that the proper balance is maintained throughout the curing operation. The balancing of the differential pressures is such that the pressure admitted to the pocket 25 is sufficient to prevent collapsing of the pile fabric but, at the same time, is insufficient to interfere with forming the stock to the contour of the form.

In the present instance, the fluid under pressure admitted to the pocket 25 is controlled by a valve assembly 32 having a valve casing 33 divided into two chambers 34 and 35 by means of a diaphragm 36. The upper chamber 34 communicates with the interior of the pressure chamber 30 through the medium of a conduit 37 so that the pressure in the chamber 34 is the same as the pressure acting upon the rubber stock during the vulcanizing process. The lower chamber 35 communicates with the interior of the pocket 25 through the medium of a conduit 38 and also communicates with a fluid pressure supply conduit 39 through the medium of a valve 40.

Upon reference to Figure 6, it will be noted that the supply line 39 communicates with a chamber 41 and the distributing line 38 communicates with a second chamber 42 separated from the chamber 41 by means of a web 43 having an opening 44 therethrough establishing communication between the two chambers. The opening 44 is controlled by the valve 40 having a valve stem 45 extending through the opening 44 and having an enlarged portion 46 on the stem normally urged into seating engagement with the opening 44 by means of a spring 47. The lower portion of the stem is axially bored to provide a passage 48 terminating at a point below the enlargement 46 and communicating with the interior of the chamber 42 by means of a transverse passage 49. The lower end of the passage 48 communicates with still another chamber 50 separated from the chamber 42 by means of a web 51 having a central opening therethrough forming a guide for the valve stem 45. The chamber 50 communicates with the atmosphere through the medium of an exhaust conduit 52 and communication between the chamber 42 and the chamber 50 is controlled by means of a valve 53. The valve 53 is supported for sliding movement in the direction of the valve stem 45 and the upper end thereof is adapted to control the lower end of the passage 48 through the valve stem 45.

The valve 53 is operated by the diaphragm 36 through the medium of an actuating arm 54 having one end pivotally connected to the central portion of the diaphragm, as at 55, and having the opposite end pivotally connected to the slide valve 53, as at 56. The arm 54 is fulcrumed intermediate the ends by a flexible diaphragm 57 having the marginal portions fixedly secured and forming a seal for the chamber 35. The central portion of the diaphragm 36 is normally urged in an upward direction against the stops 58 to a position wherein the exhaust valve 53 is open by means of a spring 59 having the lower end connected to the central portion of the diaphragm and having the upper end secured to a nut 60 which, in turn, is threaded on an adjusting screw 61.

*Operation of the differential pressure controlled valve*

The differential pressure controlled valve 32 is shown in Figure 6 in its inoperative position wherein the valve 40 is closed to prevent the supply of fluid pressure to the pocket 25 and wherein the exhaust valve 53 is open to provide for exhausting the pocket 25 through the passage 48 in the valve stem 45. However, as soon as the curing medium pressure is admitted into the pressure chamber 30 through the medium of the supply pipe 31, this fluid medium flows through the conduit 37 into the upper chamber 34 of the valve and acts upon the diaphragm 36 tending to move the latter downwardly against the action of the spring 59 to close the exhaust valve 53. In other words, as the central portion of the diaphragm 36 is moved downwardly by the pressure of the curing medium, the valve 53 is moved upwardly by the arm 54 to close the lower end of the passage 48 in the valve stem 45. As a result, communication between the supply line 39 and exhaust conduit 52 is closed. Upon continued downward movement of the central portion of the diaphragm 36, the valve 53 lifts the valve 40 against the action of the spring 47 and opens communication between the supply line 39 and the delivery conduit 38. Accordingly, fluid under pressure from the source of supply flows through the delivery conduit 38 into the pocket 25 and into the chamber 35 below the diaphragm 36. The fluid pressure admitted to the chamber 35 counteracts the pressure of the curing medium in the chamber 34 and tends to move the central portion of the diaphragm in an upward direction to again open the exhaust valve 53. This force of the fluid pressure in the chamber 35 is assisted by the spring 59, with the result that the pressure in the chamber 35 and in the pocket 25 is maintained below the pressure in the chambers 30 and 34. It follows, therefore, that the pressure in the vulcanizing chamber 30 is at all times balanced against the sum of the spring tension and the differential pressure in the pocket 25. In other words, the difference between the pressure of the curing medium in the vulcanizing chamber 30 and the pressure in the pocket 25 is a constant equal to the tension of the spring 59 which is adjustable to provide for varying the pressure differential.

When the curing operation is completed and the pressure supply line 31 is closed by a suitable valve (not shown), the pressure in the chamber 35 will, of course, predominate. As a result, the central portion of the diaphragm 36 is moved upwardly and the valve 53 is moved downwardly by the arm 54 to not only open the exhaust passage 48, but to also permit the spring 47 to close the differential pressure supply line 39.

Thus, from the foregoing, it will be observed that I have provided a method of manufacture which renders it possible to produce composite mats of the type previously described at a nominal cost and at a rate suitable for high production methods. It will also be observed that the apparatus required to carry out the several steps of the method is simple and inexpensive to construct and maintain.

What I claim as my invention is:

1. Those steps in the method of manufacturing a composite mat which consist in relatively positioning a sheet of vulcanizable stock and a sheet of pile fabric on a contoured form with the base of the fabric in contact with the side of the uncured stock facing the form, vulcanizing the stock to the contour of the form by applying a heated fluid under pressure to the exposed surface of the stock, and counteracting the pressure exerted by the heated fluid on the portion of the stock engaged by the pile fabric with an opposing fluid under pressure which is slightly less than the pressure of the heated fluid but which is sufficient to prevent matting of the pile against the form.

2. Those steps in the method of manufacturing a composite mat which consist in relatively positioning a sheet of vulcanizable stock and a sheet of pile fabric on a contoured form with the base of the fabric in contact with the side of the uncured stock facing the form, vulcanizing the stock to the contour of the form by applying a heated fluid under pressure to the exposed surface of the stock, subjecting the pile fabric to a fluid under pressure opposing the pressure of the curing medium, and controlling the counteracting pressures so that the pressure of the heated fluid exerted on the exposed surface of the stock is sufficient to conform the stock to the contour of the form against the opposing pressure but is insufficient to cause matting of the pile against the form.

3. Those steps in the method of manufacturing a composite mat which consist in relatively positioning a sheet of vulcanizable stock and a sheet of pile fabric on a contoured form with the base of the fabric in contact with the side of the uncured stock facing the form, applying an adhesive binder to the base of the fabric prior to engaging the base with the uncured stock, vulcanizing the stock to the contour of the form and securing the stock to the base of the pile fabric by applying a heated fluid under pressure to the exposed face of the stock, and counteracting the pressure of the heated fluid with an opposing pressure under pressure confined to the area occupied by the pile fabric, said counteracting fluid under pressure being less than the pressure of the heated fluid but being sufficient to prevent matting of the pile against the form.

4. Those steps in the method of manufacturing a composite mat which consist in relatively positioning a sheet of vulcanizable stock and a sheet of pile fabric on a contoured form with the base of the fabric in contact with the side of the uncured stock facing the form, effecting a seal between the marginal edge portions of the stock and form by subjecting the surface of the latter portions facing the form to the action of suction, vulcanizing the stock to the contour of the form and securing the base of the pile fabric to the stock by subjecting the exposed surface of the stock to the action of a heated fluid under pressure, and opposing the pressure of the heated fluid acting on the pile fabric with a counteracting fluid pressure less than the pressure of the heated fluid but sufficient to prevent matting of the pile against the form during the vulcanizing process.

5. Those steps in the method of manufacturing a composite mat which consist in relatively positioning a sheet of flexible stock and a sheet of pile fabric on a contoured form with the base of the fabric in contact with the side of the stock facing the form, applying an adhesive binder to the base of the pile fabric, subjecting the exposed surface of the stock to the action of fluid under pressure to secure the base of the pile fabric to the opposite surface of the stock, and opposing the fluid pressure applied to the area of the stock opposite the pile fabric with a counteracting fluid under pressure less than the pressure applied to the exposed surface of the stock but sufficient to prevent matting of the pile against the form.

DON FREMONT COLLINS.